United States Patent
Wang

(10) Patent No.: US 7,031,545 B2
(45) Date of Patent: Apr. 18, 2006

(54) METHOD AND APPARATUS FOR AUTOMATICALLY ADJUSTING SHARPENING WEIGHTING VALUE

(76) Inventor: Kuo-Jeng Wang, 14, Kung-An St., Hsian-Kang, Kaohsiung City (TW)

( * ) Notice: Subject to any disclaimer, the term of this patent is extended or adjusted under 35 U.S.C. 154(b) by 516 days.

(21) Appl. No.: 10/105,485

(22) Filed: Mar. 26, 2002

(65) Prior Publication Data

US 2003/0185458 A1    Oct. 2, 2003

(51) Int. Cl.
*G06K 9/40*    (2006.01)

(52) U.S. Cl. ...................... 382/255; 382/275

(58) Field of Classification Search ............... 382/255, 382/266, 261, 275, 279, 300, 274; 348/254; 356/124.5; 358/2.1, 532
See application file for complete search history.

(56) References Cited

U.S. PATENT DOCUMENTS

| | | | |
|---|---|---|---|
| 3,743,427 A * | 7/1973 | Weiser | 356/124.5 |
| 4,817,181 A * | 3/1989 | Kamiya | 382/274 |
| 5,995,248 A * | 11/1999 | Katori et al. | 358/2.1 |
| 6,452,631 B1 * | 9/2002 | Hsu et al. | 348/254 |

* cited by examiner

Primary Examiner—Kanjibhai Patel
(74) Attorney, Agent, or Firm—Berkeley Law & Technology Group, LLC

(57) ABSTRACT

A method of automatically adjusting sharpening weighting value in an image sharpening process is disclosed. The method utilizes scanning a correction board having a black reference region, a white reference region and a plurality of line pair regions to aid the calculations of the modulation transfer function value and noise value. The method automatically adjusts weighting values of a sharpening function and avoids accompanying noise increase simultaneously in an image sharpening process performed in an image processing apparatus and thereby high quality images with high signal/noise ratio can be provided.

16 Claims, 3 Drawing Sheets

| P5 | P1 | P8 |
| --- | --- | --- |
| P2 | P0 | P4 |
| P6 | P3 | P7 |

FIG.3

METHOD AND APPARATUS FOR AUTOMATICALLY ADJUSTING SHARPENING WEIGHTING VALUE

BACKGROUND OF THE INVENTION

1. Field of the Invention

The present invention relates to a method of automatically sharpening weighting value in an image sharpening process, and more particularly to a method of automatically adjusting weighting values of a sharpening function and avoiding accompanying noise increase simultaneously in an image sharpening process performed in an image processing apparatus.

2. Description of the Related Art

In general, it is well known that, in an image processing apparatus, defocused images take place due to a possible degradation in the MTF (Modulation Transfer Function) of devices used therein.

Heretofore, in conventional picture processing apparatus, in order to correct these defocused images in a picture, a spatial filtering process is applied. This spatial filtering process is elucidated below. Defocused images in pictures are basically caused by possible imperfections of the MTF characteristics. Therefore, the spatial filtering processing is carried out by enhancing the data of relevant pixels by utilizing the data of a plurality of reference pixels in the vicinity of those relevant pixels. Namely, an amount of correction is determined from a difference between a data of the relevant pixel and a sum of data of pixels in the vicinity of the relevant pixel. The correction is achieved by adding this correction value to the data of the relevant pixel.

In general, when such the MTF correction was applied, noises existing in areas wherein the density distribution is flat were also enhanced and hence the Signal/Noise ratio was degraded. Thus this correction procedure eventually produces a picture which gives a noisy feeling. For solving this difficulty, an improved scheme had already been proposed that, when an absolute value of a difference between the data of the relevant pixel and a sum of the data of pixels in the nearest neighbor to the relevant pixel is less than a specified value, that is, by making no MTF correction.

In accordance with the constitution such as described above, however, a problem is left to be solved. The problem is that, (i) when the noise level in the flat portion of the density distribution of a picture is less than the above-mentioned specified value, influence of noise is not certainly included in the relevant pixels, (ii) however, when a contour line and noise are included at the same time in the relevant pixel or reference pixels, and also as a result of this, the difference between the data of the relevant pixel and a sum of the data of nearest-neighboring reference pixels exceeds a specified value, influence of noise is eventually included in the corrected data of the relevant pixel. In such circumstances, there arises an inconvenience that, even for a contour line which is expected to be a smooth line of constant density, level variation is to be include.

Furthermore, there is another inconvenience as follows: when the absolute value of the difference between the data of the relevant pixel and the sum of the data of pixels in the nearest neighbor to the relevant pixel is less than a specified value. Therefore, for cases such that the level of the contour line varies gradually from a high level to a low level, the enhancement process stops after the level becomes below a certain value, and the continuity of contour lines is interrupted.

And, in the conventional prior art, only one common coefficient or weighting values of the MTF was used for both those areas wherein the level difference is large and also for those areas wherein the level difference is small. This also gives another inconvenience that contour lines are enhanced excessively in those areas wherein the level difference on the contour line is large.

Furthermore, there is still another inconvenience. That is, although low-level noises in the high frequency range of the spatial frequency are certainly not enhanced, these noises are to appear on the picture without receiving any correction.

In view of the drawbacks mentioned with the prior art, there is a continued need to develop a new and improved method of image scanner that overcome the disadvantages associated with prior art. The requirements of this invention are that it solves the problems mentioned above.

SUMMARY OF THE INVENTION

It is therefore an object of the invention to provide an effective and automatic image sharpening method which can provide images with a high signal/noise ratio.

It is another object of this invention to provide a method of automatically adjusting weighting value of a sharpening function and avoiding accompanying noise increase simultaneously in an image sharpening process performed in an image processing apparatus.

To achieve these objects, and in accordance with the purpose of the invention, the invention provide a method of automatically adjusting a sharpening weighting value, the method comprises the following steps. First of all, a correction board having a black reference region, a white reference region and a plurality of line pair regions are scanned. Then a weighting value of a modulation transfer function is increased. Next a modulation transfer function value is calculated by using data generated from scanning said line pairs and said weighting value. Then the modulation transfer function value is compared with a preset modulation transfer function specification. Next a noise value is calculated by using data generated from scanning said black reference region and said white reference region. Finally, the noise value is compared with a preset noise specification. The line pair region set forth comprises at least two substantially parallel black lines and white region between said adjacent black lines. When the modulation transfer function value is under the preset modulation transfer function specification, the weighting value is further increased until the modulation transfer function value matches the preset modulation transfer function specification. When the noise value is over the preset noise specification, the weighting value is decreased the modulation transfer function value is re-calculated and re-compared with the preset modulation transfer function specification. When the modulation transfer function value is over the preset modulation transfer function specification, the noise value is re-calculated and re-compared with the preset noise specification.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

Figure 3:
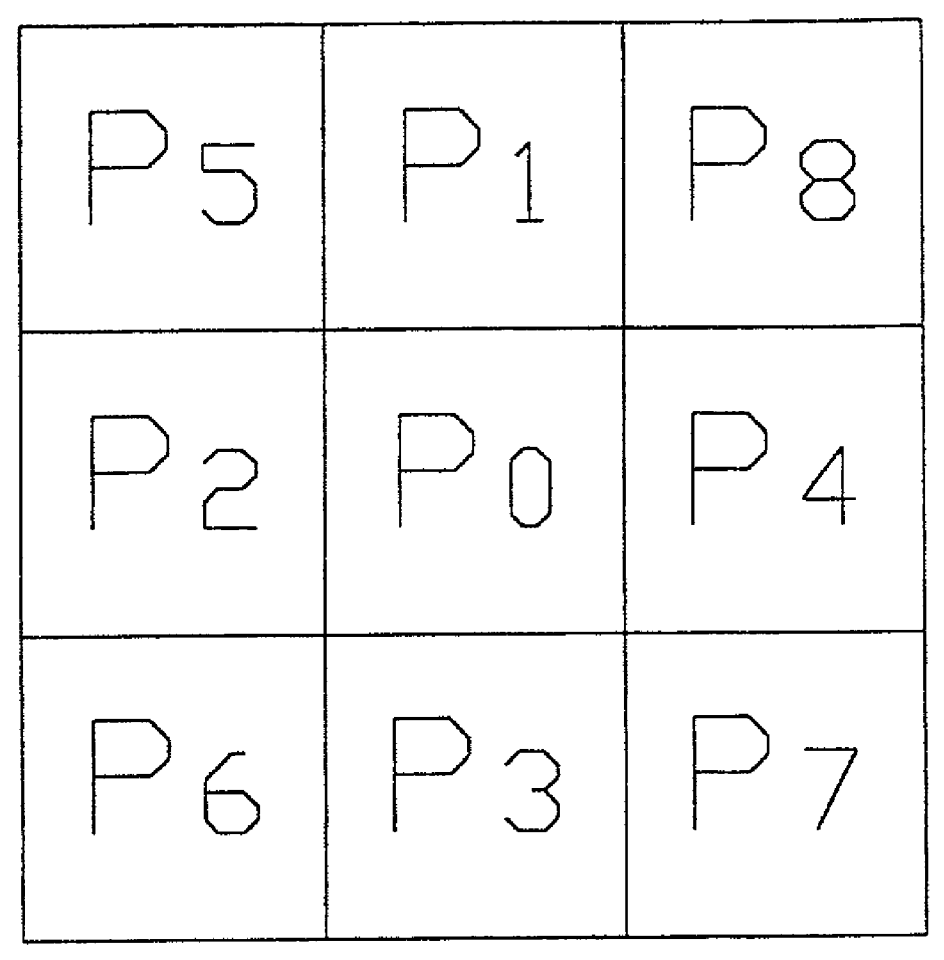

FIG. 3 shows an exemplary relation of position between the relevant pixel and the nearest-neighboring reference pixels.

DESCRIPTION OF THE PREFERRED EMBODIMENT

It is to be understood and appreciated that the method and system described below do not cover a complete method and system. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
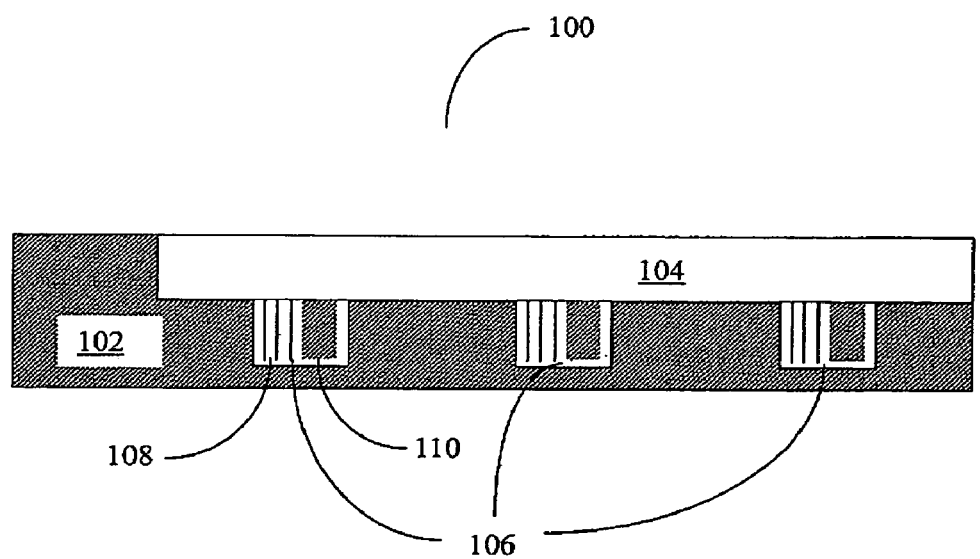
FIG. 1 shows a correction board of this invention.

Referring to FIG. 1, a correction board 100 of this invention is shown. The correction board 100 comprises a black reference region 102, a white reference region 104 and a plurality of line pair regions 106. The line pair regions 106 have at least one line pair and they have line pairs 108 and 110. Each line pair region comprises at least two black lines and a white region between two adjacent black lines. While processing image in an image processing apparatus such as an image scanner, the correction board 100 is firstly scanned to produce MTF values and noise values of images of documents or pictures so as to adjust weighting values of image sharpening. The black reference region 102 and the white reference region 104 are used to present the noise values of the images after the images are scanned. Scanning the black reference region 102 and the white reference region 104 would obviously generate data of the minimum level of brightness and data of the maximum level of brightness in photosensitive devices of image the maximum level of brightness in photosensitive devices of image scanner such as charge-coupled devices (CCD). The noise values of the images are hence contrasted sharply with the extreme levels of brightness and can be also calculated. Contrarily, the line pair regions 106 having the line pairs 108 and 110 are used to acquire the MTF values. The line pairs 108 and 110 individually comprise a plurality of substantially parallel black lines. The black lines of line pairs 108 and 110 have different slopes. Scanning the spaced black lines of line pairs 108 and 110 and the white region between the adjacent black lines will generate data of brightness level with a sharp contrast.

Figure 2:
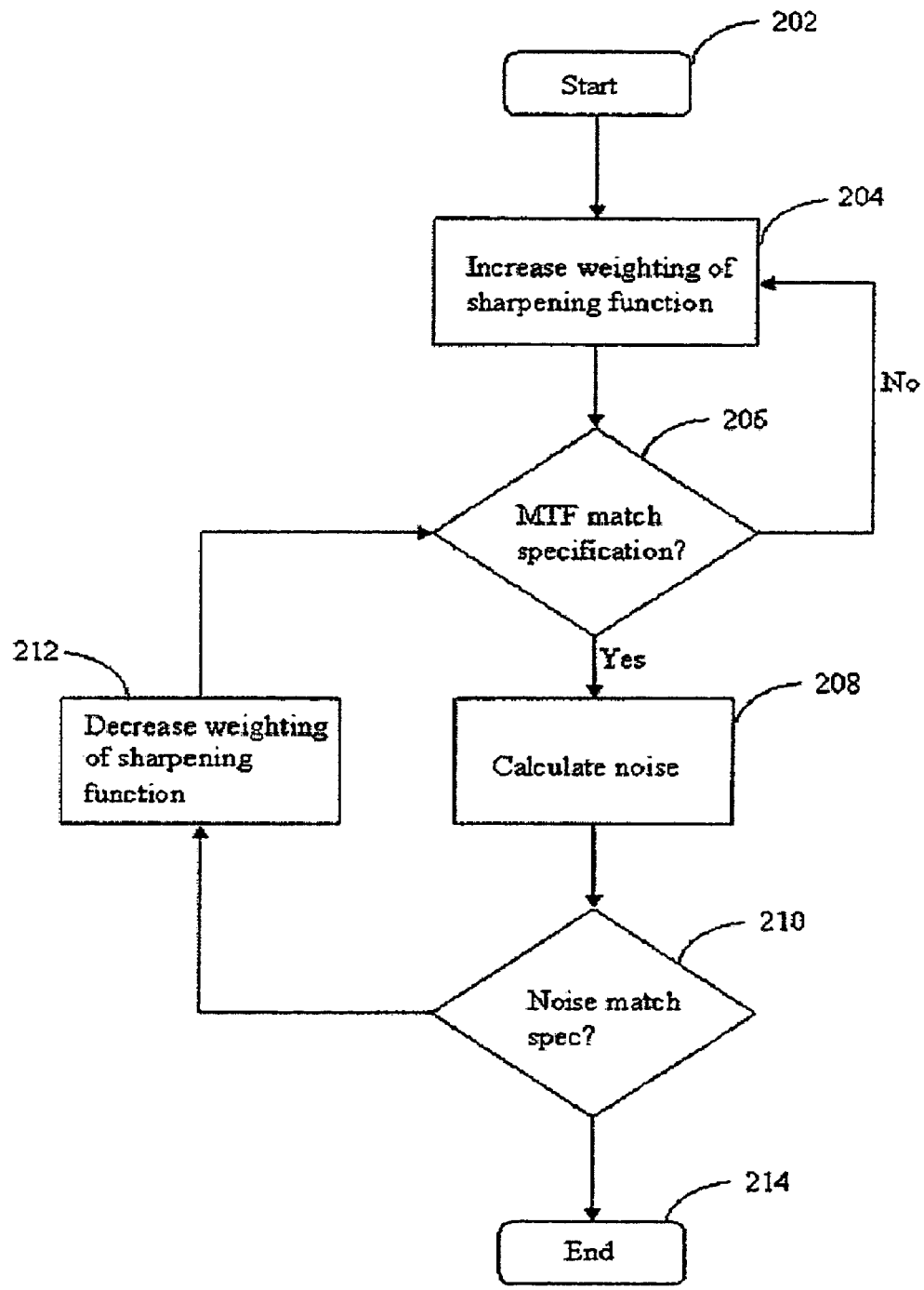
FIG. 2 shows a flow chart of this invention.

The flow chart of this invention is shown in FIG. 2. In order to improve image qualities of documents or pictures, weighting values of a sharpening function must be increased undoubtedly after scanning the documents or pictures and this is done in step 204. The sharpening function of this invention executed by image apparatuses is described as the following:

$$P=P_0+w(m_0P_0-(m_1P_1+m_2P_2+m_3P_3+m_4P_4+m_5P_5+m_6P_6+m_7P_7+m_8P_8+\ldots))$$

or $P=P_0+MTF,$ wherein P is the level of brightness of the relevant pixel after being sharpening, $P_0$ and $m_0$ are the level of brightness and the weighting value of the relevant pixel before sharpening and w represents the weighting value of the sharpening function. $P_1$ to $P_8$ separately represent the level of brightness of nearest-neighboring reference pixels and $m_1$ to $m_8$ are the weighting values of the nearest-neighboring reference pixels. The exemplary relation of position between the relevant pixel and the nearest-neighboring reference pixels is shown in FIG. 3. It is noted that the number of the nearest-neighboring reference pixels is not necessarily eight and more than eight reference pixels if necessary or less than eight reference pixels can be selected.

Now referring back to FIG. 2, a MTF specification and a noise specification are previously set in the image apparatus. A MTF value of the scanned documents or pictures is acquired by scanning the line pair regions 106 and the black reference region 102 and the white reference region 104 of the correction board 100 in the image apparatus. Then the MTF value with the increased weighting value of the sharpening function provided in step 204 is compared with the MTF specification in step 206. If the MTF value dose not match the MTF specification, that is, smaller than the MTF specification, then the weighting value of the sharpening function is further increased until it is larger than the MTF specification. Contrarily, if the MTF value matches the MTF specification, then the noise value of the of the scanned documents or pictures is calculated in step 208. The noise value of the scanned documents or pictures is acquired by scanning the black reference region 102 and the white reference region 104 of the correction board 100 in the image apparatus and calculating the data of scanning the black reference region 102, the white reference region 104 and the documents or pictures. The noise value is then compared with the preset noise specification in step 210 so as to determine whether the noise value matches or dose not match the preset noise specification. If the noise value is smaller than the preset noise specification, then this image sharpening process is terminated. Contrarily, if the noise value is over the preset noise specification, then the weighting value of the sharpening function is decreased in step 212. By using the decreased weighting value of the sharpening function provided in step 212, a new MTF value is calculated again and a new noise value is calculated again in step 208. The new noise value is then compared with the noise specification in step 210. The weighting value of the sharpening function will be adjusted continually through steps 212, 206, 208 and 210 until the final noise value matches the noise specification.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claim is:

1. A method comprising:

scanning a correction board having a black reference region, a white reference region and a plurality of line pair regions;

increasing a sharpening function weighting value;

calculating a modulation transfer function value by using data generated from scanning said line pair regions and said weighting value;

comparing said calculated modulation transfer function value with a preset modulation transfer function specification;

calculating a noise value by using data generated from scanning said black reference region and said white reference region; and comparing said calculated noise value with a preset noise specification.

2. The method according to claim 1, wherein each said line pair region comprises at least two substantially parallel black lines and a white region between said adjacent black lines.

3. The method according to claim 1, when said calculated modulation transfer function value is under said preset modulation transfer function specification, said sharpening function weighting value is further increased until said calculated modulation transfer function value matches said preset modulation transfer function specification.

4. The method according to claim 1, when said calculated noise value is aver said preset noise specification, said sharpening function weighting value is decreased and said modulation transfer function value is re-calculated and re-compared with said preset modulation transfer function specification.

5. The method according to claim 4, when said calculated modulation transfer function value is over said preset modulation transfer function specification, said noise value is re-calculated and re-compared with said preset noise specification.

6. A method comprising:
  scanning a correction bard having a black reference region, a white reference region and a plurality of line pair regions;
  increasing a sharpening function weighting;
  calculating a modulation transfer function valve by using data generated from scanning said line pair regions and said sharpening function weighting value;
  comparing said calculated modulation transfer function value with a preset modulation transfer function specification;
  calculating a noise value by using data generated from scanning said black reference region and said white reference region, wherein said modulation transfer function value is over a preset modulation transfer function specification;
  comparing said calculated noise value with a preset noise specification;
  decreasing said sharpening function weighting value when said calculated noise value is over said preset noise specification;
  re-calculating said modulation transfer function value by using said decreased sharpening function weighting value;
  re-comparing said re-calculated modulation transfer function value with said preset modulation transfer function specification;
  re-calculating said noise value; and
  re-comparing said re-calculated noise value with said preset noise specification.

7. The method according to claim 6, wherein each said line pair region comprises at least two substantially parallel black lines and a white region between said adjacent black lines.

8. The method according to claim 6, wherein each said line pair region comprises at least two set of line pairs, each line pairs has an individual slope.

9. A method comprising:
  scanning a correction board having a black reference region, a white reference region and a plurality of line pair regions, wherein each said line pair region comprises at least two sets of line pairs, each line pair having an individual slope and at least two substantially parallel black lines and a white region between said adjacent black lines;
  increasing a sharpening function weighting value;
  calculating a modulation transfer function value by using data generated from scanning said line pair regions and said weighting value;
  comparing said calculated modulation transfer function value with a preset modulation transfer function specification;
  calculating a noise value by using data generated from scanning said black reference region and said white reference region; and
  comparing said calculated noise value with a preset noise specification.

10. The method according to claim 9, when said calculated modulation transfer function value is under said preset modulation transfer function specification, said sharpening function weighting value is further increased until said calculated modulation transfer function value matches said preset modulation transfer function specification.

11. The method according to claim 9, when said calculated noise value is over said preset noise specification, said sharpening function weighting value is decreased and said modulation transfer function value is re-calculated and re-compared with said preset modulation transfer function specification.

12. The method according to claim 11, when said calculated modulation transfer function value is over said preset modulation transfer function specification, said noise value is re-calculated and re-compared with said preset noise specification.

13. A method, comprising:
  scanning a correction board having a black reference region, a white reference region and a line pair region;
  calculating a modulation transfer function value using information generated by the scanning operation of the correction board and further using a weighting value;
  comparing said calculated modulation transfer function value with a preset modulation transfer function specification; and
  increasing the weighting value if the calculated modulation transfer function value is less than the preset modulation transfer function value.

14. The method of claim 13, further comprising:
  calculating a noise value by using information generated by the scanning operation of the correction board and further using the weighting value;
  comparing said calculated noise value with a preset noise specification; and
  decreasing the weighting value if the calculated noise value exceeds the preset noise specification.

15. An apparatus, comprising:
  means for scanning a correction board having a black reference region, a white reference region and a line pair region;
  means for calculating a modulation transfer function value using information generated by the scanning operation of the correction board and further using a weighting value;
  means for comparing said calculated modulation transfer function value with a preset modulation transfer function specification; and
  means for increasing the weighting value if the calculated modulation transfer function value is less than the preset modulation transfer function value.

16. The apparatus of claim 15, further comprising:
  means for calculating a noise value by using information generated by the scanning operation of the correction board and further using the weighting value;
  means for comparing said calculated noise value with a preset noise specification; and
  means for decreasing the weighting value if the calculated noise value exceeds the preset noise specification.

* * * * *

UNITED STATES PATENT AND TRADEMARK OFFICE
CERTIFICATE OF CORRECTION

PATENT NO. : 7,031,545 B2  Page 1 of 1
APPLICATION NO. : 10/105485
DATED : April 18, 2006
INVENTOR(S) : Kuo-Jeng Wang It is certified that error appears in the above-identified patent and that said Letters Patent is hereby corrected as shown below:

Col. 5, Claim 4, at line 12: "aver" should be changed to --over--

Col. 5, Claim 6, at line 23: "bard" should be changed to --board--

Col. 5, Claim 6, at line 27: "valve" should be change to --value--

Signed and Sealed this

Eighth Day of July, 2008

JON W. DUDAS
*Director of the United States Patent and Trademark Office*